United States Patent
Acharya et al.

(10) Patent No.: US 12,535,529 B2
(45) Date of Patent: Jan. 27, 2026

(54) METHOD AND SYSTEM FOR A BATTERY MONITORING CIRCUIT

(71) Applicant: GE Aviation Systems LLC, Grand Rapids, MI (US)

(72) Inventors: Sayan Acharya, Niskayuna, NY (US); Cong Li, Clifton Park, NY (US); Satish Prabhakaran, Albany, NY (US); Frank J. Mueller, Glenville, NY (US); Ahmed Elasser, Latham, NY (US)

(73) Assignee: GE Aviation Systems LLC, Grand Rapids, MI (US)

( * ) Notice: Subject to any disclaimer, the term of this patent is extended or adjusted under 35 U.S.C. 154(b) by 228 days.

(21) Appl. No.: 18/348,433

(22) Filed: Jul. 7, 2023

(65) Prior Publication Data

US 2025/0012866 A1 Jan. 9, 2025

(51) Int. Cl.
*G01R 31/389* (2019.01)
*G01R 31/3835* (2019.01)

(52) U.S. Cl.
CPC ....... *G01R 31/389* (2019.01); *G01R 31/3835* (2019.01)

(58) Field of Classification Search
CPC ............. G01R 31/389; G01R 31/3835; G01R 31/386; G01R 31/392; H01M 10/482
See application file for complete search history.

(56) References Cited

U.S. PATENT DOCUMENTS

| | | | |
|---|---|---|---|
| 7,619,390 B2 | 11/2009 | Kim | |
| 7,847,557 B2 | 12/2010 | Yun et al. | |
| 10,288,693 B2 | 5/2019 | Baker et al. | |
| 11,372,054 B2 | 6/2022 | Marsili et al. | |
| 2012/0126819 A1 | 5/2012 | Liu | |
| 2016/0077160 A1 | 3/2016 | Wampler, II et al. | |
| 2018/0067158 A1* | 3/2018 | Kawamura | B60L 3/0069 |
| 2020/0132781 A1* | 4/2020 | Marsili | G01R 31/389 |
| 2020/0249281 A1 | 8/2020 | Ishii et al. | |
| 2021/0109159 A1 | 4/2021 | Lammeren | |
| 2021/0141023 A1 | 5/2021 | Gunji | |
| 2021/0333329 A1 | 10/2021 | Li | |
| 2021/0396815 A1 | 12/2021 | Bang | |
| 2023/0204677 A1* | 6/2023 | Izutani | G01R 31/006 324/430 |

FOREIGN PATENT DOCUMENTS

| | | |
|---|---|---|
| EP | 1088240 B1 | 4/2006 |
| JP | 2013228216 A | 11/2013 |
| JP | 2019117180 A | 7/2019 |
| JP | 2023058158 A | 4/2023 |
| KR | 20230067793 A | 5/2023 |
| WO | 2022062599 A1 | 3/2022 |

* cited by examiner

*Primary Examiner* — Daniel R Miller
(74) *Attorney, Agent, or Firm* — Thomas | Horstemeyer, LLP (57) ABSTRACT

A method and system for determining the health of a set of batteries through the use of a battery monitoring circuit. The battery monitoring circuit including a first current loop and a second current loop. The first current loop being enabled by a first switch, a first resistor and a second switch. The second current loop being enabled by the first switch, a third switch, a voltage sensor, and the second switch.

20 Claims, 5 Drawing Sheets

METHOD AND SYSTEM FOR A BATTERY MONITORING CIRCUIT

METHOD AND SYSTEM FOR A BATTERY MONITORING CIRCUIT GOVERNMENT SPONSORED RESEARCH

The project leading to this application has received funding from the National Aeronautics and Space Administration under the NASA EPFD project and under grant agreement No. 80AFRC-21-C-A021.

TECHNICAL FIELD

This disclosure generally relates to a battery monitoring circuit, specifically to a battery monitoring circuit used for determining the health of a set of batteries.

BACKGROUND

A battery is used as an energy source to feed DC electrical loads. During the lifetime of a battery, its health may deteriorate, which can result in a decreased power output of the battery or of its capacity. One method of determining the health of a battery is by measuring and evaluating its impedance. Impedance measurement is done by injecting a sinusoidal current into the battery terminals and measuring the injected sinusoidal current and the voltage across the battery. The battery impedance is then estimated through use of the sinusoidal current and the measured battery voltage.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Aspects of the present disclosure described herein are directed to a battery monitoring circuit used to monitor the health of a set of batteries. The battery monitoring circuit includes, at least, a first current loop and a second current loop. The second current loop having an impedance analyzer. The battery monitoring circuit will be described in terms of a battery monitoring circuit for a set of batteries provided on an aircraft or otherwise used for avionics purposes. However, it will be understood that the disclosure is not so limited to a battery monitoring circuit for an aircraft and that it has general applicability to in non-aircraft applications, including other mobile applications and non-mobile industrial, commercial, and residential applications. For example, applicable mobile environments can include an aircraft, spacecraft, space-launch vehicle, satellite, locomotive, automobile, etc. Commercial environments can include manufacturing facilities or power generation and distribution facilities or infrastructure.

While "a set of" various elements will be described, it will be understood that "a set" can include any number of the respective elements, including only one element. For example, as used herein the term set of batteries can refer to a singular battery including a single battery cell or a plurality of batteries each including a set of respective battery cells. Further, as used herein, the term battery or iterations thereof can refer to a single battery cell or a battery module. Each battery module includes a plurality of battery cells coupled to each other in series and parallel with each other. As such, the set of batteries can, for example, include multiple battery modules with each battery module including a set of battery cells.

The use of the terms "proximal" or "proximally" refers to moving in a direction toward another component, or a component being relatively closer to the other as compared to another reference point. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interrelated when describing aspects of the electrical circuit, or circuit operations.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured, connected, or connectable to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus, or between buses.

Directional references such as upstream and downstream are used with respect to a circuit. As used herein, the terms directional references in terms of the circuit are with respect to the flow of current within the circuit.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

Aspects of the disclosure can be employed in any electrical circuit environment comprising a power source delivering power to a load. One non-limiting example of such an electrical circuit environment can be an aircraft power system architecture, which enables production of electrical power from at least one spool of a turbine engine, and delivers the electrical power through a power converter to a set of electrical loads. A typical power converter is a power processing circuit that converts an input voltage into a specified output voltage. A controller can be associated with the power converter to control an operation thereof by selectively controlling the conduction periods of switches employed therein. The switches employed by the power converter are typically semiconductor switching devices (e.g., MOSFETs). Although various non-limiting aspects are depicted and described herein using various semiconductor switching devices such as MOSFETS, other aspects are not so limited. Other non-limiting aspects can include any desired switching device that can switch a state between a low resistance state and a high resistance state in response to an electrical signal. For example, the switching devices in various aspects can comprise, without limitation, any desired type of switching element including for example, transistors, gate commutated thyristors, field effect transistors (FETs), insulated-gate bipolar transistors (IGBT) s, MOSFETs, and the like.

The exemplary drawings are for purposes of illustration only and the dimensions, positions, order and relative sizes reflected in the drawings attached hereto can vary.

Figure 1:
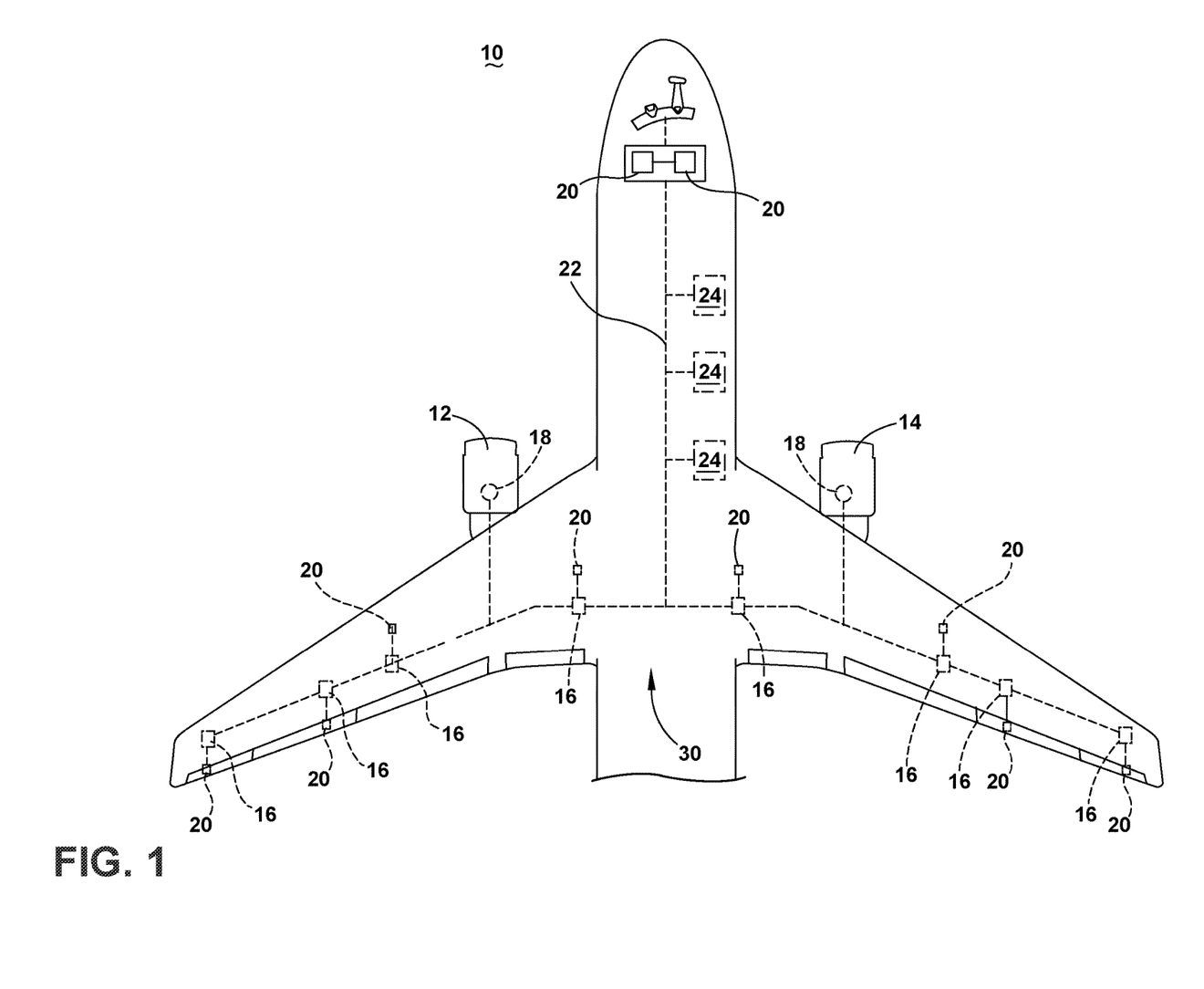
FIG. 1 is a top-down schematic view of an aircraft and its power distribution system, in accordance with various aspects described herein.

FIG. 1 is a schematic illustration of an aircraft 10. The aircraft 10 can have a power system. The power system can, for example, include at least one turbine engine, shown as a left engine system 12 and a right engine system 14. The left and right engine systems 12, 14 can be substantially identical, and can further include at least one power source, illustrated respectively as a set of generators 18. At least one of the set of generators 18 can include variable speed or variable output generators. In this example, a variable speed or variable output generator can include a generator adapted or configured to operate within a predetermined range of input speed, gearbox speed ratios, or the like, and can generate a power output within a predetermined output range (e.g. voltage output range, current output range, frequency output range, or a combination thereof). In one non-limiting example, a variable output generator can include a generator adapted or configured to output approximately 115 Volts AC between 390 Hz and 410 Hz.

The aircraft 10 is shown further having a set of power-consuming components, or electrical loads 20, such as for instance, an actuator load, flight critical loads, and non-flight critical loads. The electrical loads 20 are electrically coupled with at least one of the generators 18 via a power distribution system 30 including, for instance, transmission lines 22, bus bars, power buses (or the like), and a set of power distribution nodes 16.

The aircraft 10 can further include a set of a set of batteries 24 selectively connectable with the transmission lines 22, and operable to provide at least a portion of primary power, supplemental power, redundant power, backup power, emergency power, or the like to at least a portion of the aircraft 10. As shown, the set of batteries 24 can provide power to the set of transmission lines 22, and thus, the set of power distribution nodes 16 or the set of electrical loads 20.

In the aircraft 10, the operating left and right engine systems 12, 14 provide mechanical energy which can be extracted, typically via a spool, to provide a driving force for the set of generators 18. The set of generators 18, in turn, generate power, such as AC or DC power, and provides the generated power to the transmission lines 22, which delivers the power to the electrical loads 20, positioned throughout the aircraft 10. Furthermore, during operation, the set of set of batteries 24 can be selectively connected with the transmission lines 22, and operable to provide primary or supplemental power to a subset of the electrical loads 20.

Example power distribution management functions can include, but are not limited to, selectively enabling or disabling the delivery of power to particular electrical loads 20, depending on, for example, available power distribution supply, criticality of electrical load 20 functionality, or aircraft mode of operation, such as take-off, cruise, or ground operations. During emergency or inadequate periods of electrical power generation, including but not limited to engine or generator failure, at least one of the supplemental power batteries 24 can be operated, enabled, or connected for providing power to the electrical loads 20. Additional management functions can be included.

It will be understood that while aspects of the disclosure are shown in an aircraft environment of FIG. 1, the disclosure is not so limited and can have applicability in a variety of environments. For example, while this description is directed toward a power system architecture in an aircraft, aspects of the disclosure can be further applicable to provide power, supplemental power, emergency power, essential power, or the like, in otherwise non-emergency operations, such as takeoff, landing, or cruise flight operations.

Furthermore, the number of, and placement of, the various components depicted in FIG. 1 are also non-limiting examples of aspects associated with the disclosure. For example, while various components have been illustrated with relative position of the aircraft 10 (e.g. the electrical loads 20 on the wings of the aircraft 10, etc.), aspects of the disclosure are not so limited, and the components are not so limited based on their schematic depictions. Additional aircraft 10 configurations are envisioned.

Figure 2:
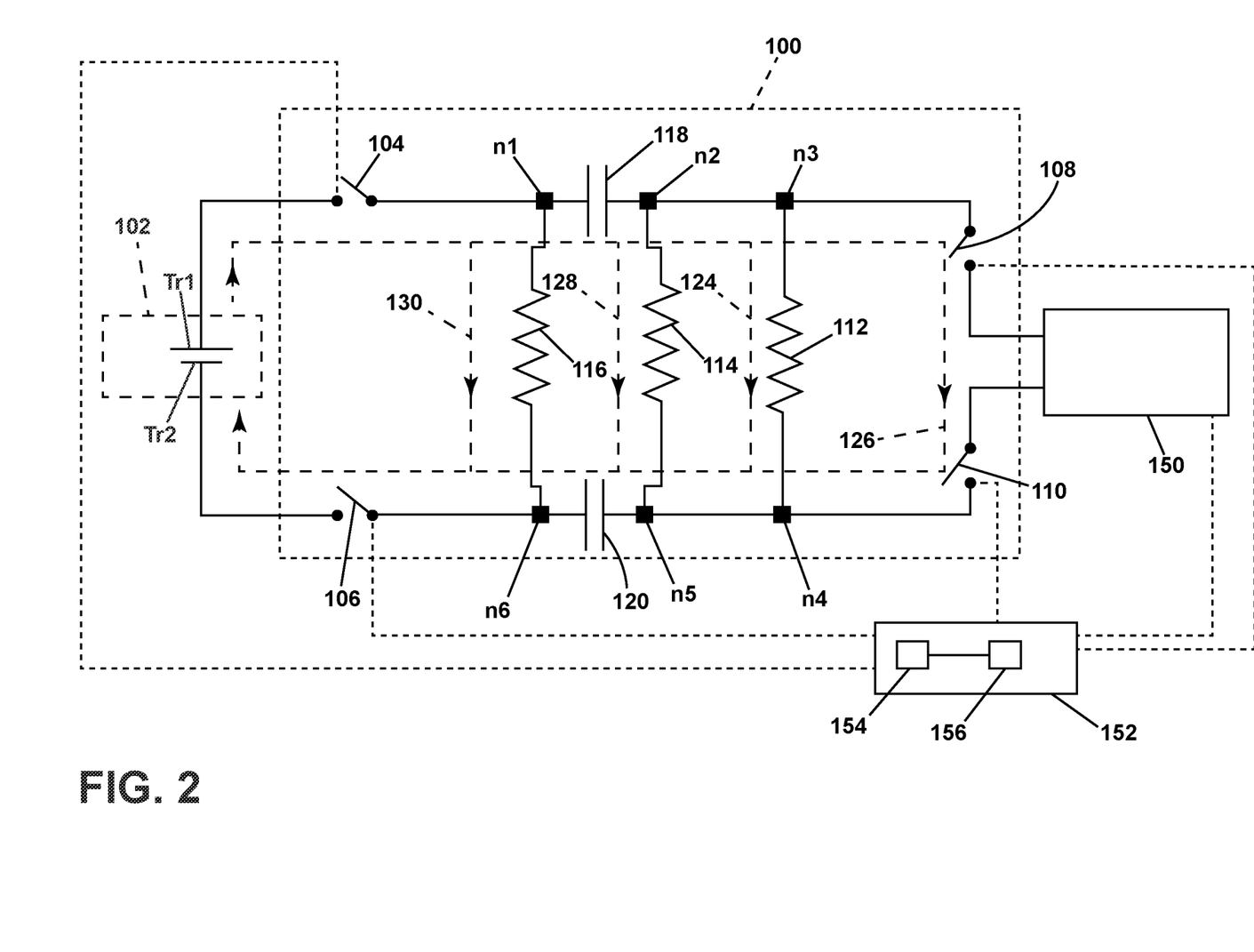
FIG. 2 is a schematic circuit diagram of a battery monitoring circuit suitable for use within the aircraft of FIG. 1, the battery monitoring circuit used to monitor the health of a set of batteries, the battery monitoring circuit including a first current loop, a second current loop, a third current loop, and a fourth current loop.

FIG. 2 is a schematic circuit diagram of a battery monitoring circuit 100 suitable for use within the aircraft 10 of FIG. 1. While described in terms of the aircraft 10, it will be appreciated that the battery monitoring circuit 100 can be used within any suitable aircraft or non-aircraft applications. As a non-limiting example, the battery monitoring circuit 100 can be used for on-aircraft, off-aircraft (e.g., testing of aircraft components), or non-aircraft applications.

The battery monitoring circuit 100 can be selectively couplable to a set of batteries 102. The battery monitoring circuit 100 includes a first terminal (Tr1) and a second terminal (Tr2). The first terminal (Tr1) can be a positive terminal while the second terminal (Tr2) can be a negative terminal such that current can flow from the first terminal (Tr1) to the second terminal (Tr2) via an electrical load.

A first switch 104 can be provided downstream of and in series with the first terminal (Tr1). A second switch 106 can be provided upstream of an in series with the second terminal (Tr2). A first node (n1) can be provided downstream of the first switch 104. A first capacitor 118 can be provided downstream of the first node (n1). A second node (n2) can be provided downstream of the first capacitor 118. A third node (n3) can be provided downstream of the second node (n2). A third switch 108 can be provided downstream of the third node (n3). A fourth switch 110 can be provided downstream of and in series with the third switch 108. A fourth node (n4) can be provided downstream of the fourth switch 110. A fifth node (n5) can be provided downstream of the fourth switch (n4). A second capacitor 120 can be provided downstream of the fifth node (n5). A sixth node (n6) can be provided downstream of the second capacitor 120. The second switch 106 can be provided downstream of the sixth node (n6).

The first switch 104, the second switch 106, the third switch 108, and the fourth switch 110 can be any suitable component of the battery monitoring circuit 100 used to selectively open or close various portions of the battery monitoring circuit 100. As a non-limiting example, the first switch 104, the second switch 106, the third switch 108, and the fourth switch 110 can be a mechanical switch or a solid-state switch.

A first resistor 112 can be provided on a branch of the battery monitoring circuit 100 extending between the third node (n3) and the fourth node (n4). The first resistor 112 can define a first resistance. A second resistor 114 can be provided on a branch of the battery monitoring circuit 100 extending between the second node (n2) and the fifth node (n5). The second resistor 114 can define a second resistance. A third resistor 116 can be provided on a branch of the battery monitoring circuit 100 extending between the first node (n1) and the sixth node (n6). The third resistor 116 can define a third resistance.

At least two of the first resistance, the second resistance, and the third resistance can be equal or non-equal. As a non-limiting example, the first resistance can be lower than the second resistance and the third resistance. As a non-limiting example, the first resistance can be lower than the second resistance and the third resistance with the second resistance being equal to the third resistance.

While a single resistor is illustrated for the first resistor 112, the second resistor 114 and the third resistor 116, it will be appreciated that at least one of the first resistor 112, the second resistor 114 and the third resistor 116 can include two or more resistors in series.

A voltage sensor 150 can be provided downstream of and in series with the third switch 108 and upstream of and in series with the fourth switch 110. The voltage sensor 150 can be any suitable component of the battery monitoring circuit 100 used to measure a voltage across experienced at the voltage sensor 150. As a non-limiting example, the voltage sensor 150 can be an impedance analyzer.

The battery monitoring circuit 100 can include a plurality of current loops. As a non-limiting example, the battery monitoring circuit 100 can define a first current loop 124, a second current loop 126, a third current loop 128, a fourth current loop 130, or a combination thereof.

The first current loop 124 can be enabled by at least the first switch 104, the first node (n1), the first capacitor 118, the second node (n2), the third node (n3), the first resistor 112, the fourth node (n4), the fifth node (n5), the second capacitor 120, the sixth node (n6), the second switch 106, or any combination thereof, in serial arrangement. As used herein, the term enabling when used in terms of a current loop can refer to providing a current or applying a voltage to or through the respective current loop. The first current loop 124 can be in parallel with the second resistor 114, the third resistor 116 and the voltage sensor 150.

The second current loop 126 can be provided in parallel with and at least partially downstream of the first current loop 124. The second current loop 126 can be enabled by the first switch 104 the first node (n1), the first capacitor 118, the second node (n2), the third node (n3), the third switch 108, the voltage sensor 150, the fourth switch 110, the fourth node (n4), the fifth node (n5), the second capacitor 120, the sixth node (n6), the second switch 106, or any combination thereof, in serial arrangement. The second current loop 126 can be in parallel with the first resistor 112, the second resistor 114 and the third resistor 116.

The third current loop 128 can be provided in parallel with and at least partially upstream of the first current loop 124 and the second current loop 126. The third current loop 128 can be enabled by the first switch 104, the first node (n1), the first capacitor 118, the second node (n2), the second resistor 114, the fifth node (n5), the second capacitor 120, the sixth node (n6), the second switch 106, or any combination thereof, in serial arrangement. The third current loop 128 can be in parallel with the first resistor 112, the third resistor 116 and the voltage sensor 150.

The fourth current loop 130 can be provided in parallel with and at least partially upstream of the first current loop 124, the second current loop 126, and the third current loop 128. The fourth current loop 130 can be enabled by the first switch 104, the first node (n1), the third resistor 116, the sixth node (n6), the second switch 106, or any combination thereof, in serial arrangement. The fourth current loop 130 can be in parallel with the first resistor 112, the second resistor 114 and the voltage sensor 150.

A controller module 152 having a processor 154 and a memory 156 can be communicatively coupled to the battery monitoring circuit 100. The memory 156 can be defined as an internal storage for various aspects of the battery monitoring circuit 100. For example, the memory 156 can store code, executable instructions, commands, instructions, authorization keys, specialized data keys, passwords, or the like. The memory 156 can be RAM, ROM, flash memory, or one or more different types of portable electronic memory, such as discs, DVDs, CD-ROMs, etc., or any suitable combination of these types of memory. The processor 154 can be defined as a portion of the controller module 152 which can receive an input, perform calculations, and output executable data. The processor 154 can be a microprocessor.

The controller module 152 can further be defined as a portion of the set of batteries 102 or otherwise be used in conjunction with the set of batteries 102. As a non-limiting example, the controller module 152 can be included within or otherwise form a battery management system.

It will be appreciated that various portions of the battery monitoring circuit 100 can be included or excluded. As a non-limiting example, the battery monitoring circuit 100 can be formed without the fourth switch 110 or the second switch 106. As a non-limiting example, the battery monitoring circuit 100 can be formed with fewer or additional current loops. As a non-limiting example, the battery monitoring circuit can be formed without the first capacitor 118 or the second capacitor 120.

Figure 3:
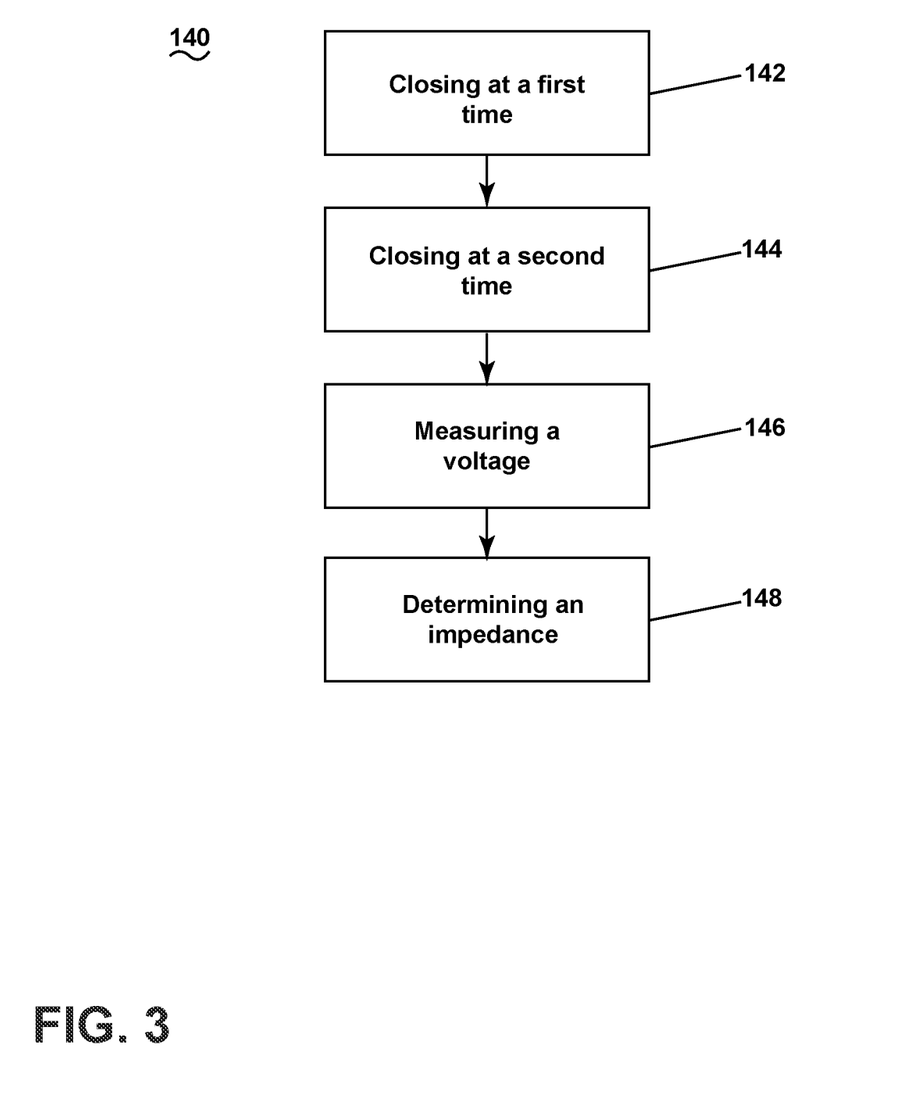
FIG. 3 is a method of determining the health of the set of batteries through the use of the battery monitoring circuit of FIG. 2.

FIG. 3 is a method 140 of determining the health of the set of batteries 102 (FIG. 2) through the use of the battery monitoring circuit 100 of FIG. 2. Reference will be made to FIGS. 2 and 3 by relating the method 140 to the physical aspects of the battery monitoring circuit 100 and the set of batteries 102 described in FIG. 2.

The method 140 can include closing, at a first time, the first switch 104 and the second switch 106, at 142. It will be appreciated that the first time can be a particular time (e.g., at time=0 seconds) where both the first switch 104 and the second switch 106 or a time frame (e.g., between where times=0 seconds and where time=1 second) where the first switch 104 and the second switch 106 are closed. Closing, at the first time, can enable at least the first current loop 124. Closing, at the first time, can further include enabling the first current loop 124, the third current loop 128 and the fourth current loop 130. As a non-limiting example, closing the first switch 104 and the second switch 106 enables a current from the set of batteries 102 to be supplied to at least a portion of the battery monitoring circuit 100. As a non-limiting example, at the first time the third switch 108 can be opened such that the current flows only through the first current loop 124, the third current loop 128 and the fourth current loop 130. It is contemplated that when the first switch 104 and the second switch 106 are closed, a majority of the current from the set of batteries 102 will flow through the first current loop 124 due to the lower rating of the first resistor 112 with respect to at least the second resistor 114 and the third resistor 116. As such, the first current loop 124 can be defined as a primary current loop.

At least the third switch 108 can be closed, at a second time, at 144. It will be appreciated that the second time can be a particular time greater than the first time (e.g., at time>first time) where the third switch 108 is closed or a time frame after the first time (e.g., between >0 seconds and ≤1 second after the first time) where the third switch 108 is closed. Closing, at the second time, can enable the second current loop 126. It will be appreciated that the fourth switch 110 can be optionally included. In such a case where it is included, the method can include closing, at the second time, the third switch 108 and the fourth switch 110, at 144. When the third switch 108, and optionally the fourth switch 110 if the fourth switch 110 is included, is closed at the second time, at least a portion of the current already flowing through the battery monitoring circuit 100 from the set of batteries 102 can be supplied to the second current loop 126.

The second time can be after the first time. As a non-limiting example, the second time can be greater than or equal to 0.5 seconds after and less than or equal to 1.5 seconds after the first time.

The voltage sensor 150 can measure a voltage between the second node (n2) and the third node (n3), at 146. From the measured voltage, an impedance of the set of batteries 102 can be determined, at 148. The determined impedance can be used to determine the health status of the set of batteries 102 and be indicative of whether or not the set of batteries 102 are in a healthy or unhealthy state. As used herein, the term "determined" can include the calculation of an exact value or an estimation of a value.

The use of the battery monitoring circuit 100 ensures that the voltage experienced at the voltage sensor 150 is within the voltage threshold that can be handled by the voltage sensor. As a non-limiting example, the voltage sensor 150 can be rated for a maximum voltage of 10 Volts, however, the set of batteries 102 can output a voltage greater than 10 Volts. At least the first current loop 124, and optionally the third current loop 128 or the fourth current loop 130 can be used to reduce the voltage experienced at the voltage sensor 150.

It is contemplated that the battery monitoring circuit 100 can reduce a first voltage directly from the set of batteries 102 (e.g., supplied directly to the first switch 104) to a second voltage that is experienced at the voltage sensor 150.

As a non-limiting example, TABLE I, below, has been provided to illustrate an example environment where the output of the set of batteries 102 is 800 Volts. TABLE I illustrates the voltages experienced at each of the nodes (n1-n6) along with the voltage experienced at the voltage sensor 150, with respect to the sixth node (n6).

TABLE I

|  | Experienced Voltage with respect to the sixth node (n6) (V) |
| --- | --- |
| First node (n1) | 800 |
| Second node (n2) | 400 |
| Third node (n3) | 400 |
| Fourth node (n4) | 400 |
| Fifth node (n5) | 400 |
| Sixth node (n6) | 0 |
| Voltage at the sensor 150 | 0 |

The reduction of the voltage from the first voltage to the second voltage can allow for a voltage sensor 150 with a low voltage rating to be used. For example, if the voltage were not reduced and the voltage experienced at the voltage sensor 150 were equal to or near the first voltage, a much higher rating for the voltage sensor 150 would be required, which may not be possible or otherwise very expensive to implement.

It will be understood that the method 140 is flexible. For example, the sequence of steps depicted is for illustrative purposes only, and is not meant to limit the method 140 in any way, as it is understood that the steps can proceed in a different logical order or additional or intervening steps can be included without detracting from embodiments of the present disclosure.

As a non-limiting example, the method 140 can include rating the first resistor 112 with the first resistance lower than the second resistance of the second resistor 114 or the third resistance of the third resistor 116. This, in turn, enables a majority of the current from the set of batteries 102 to flow through the first current loop 124.

As a non-limiting example, the method 140 can include opening, prior to or during the first time, at least the third switch 108 and optionally the fourth switch 110. This, in turn, can ensure that the current from the set of batteries 102 does not flow through the second current loop 126 at the first time.

As a non-limiting example, the method 140 can include injecting, by the voltage sensor 150, a sinusoidal current into the second current loop 126 while the voltage sensor 150 is measuring the voltage, at 146. The voltage sensor 150 can then inject the sinusoidal current into the second current loop 126 and measure the voltage over a set amount of time and use these measurements to estimate or otherwise determine the impedance of the set of batteries 102. It is contemplated that the measuring, at 146, and the determining, at 148, can be done by the voltage sensor 150.

Alternatively, the method 140 can include receiving, after measuring at 146, a measured voltage at the controller module 152. The controller module 152 can then use the measured voltage and the processor 154 to determine the voltage, at 148.

As a non-limiting example, the method 140 can include closing, by the controller module 152 at the first time, the first switch 104 and the second switch 106, at 142. The method 140 can include closing, by the controller module 152 at the second time, at least the third switch 108 and optionally the fourth switch 110, at 144. The third switch 108 and the fourth switch 110 can be closed simultaneously or non-simultaneously with respect to one another. As a non-limiting example, the method 140 can include retrieving, from the memory 156 or a memory accessible by the controller module 152, an executable runtime function of the battery monitoring circuit and further operating, by the controller module 152, the battery monitoring circuit 100 according to the executable runtime function. The executable runtime function can be any suitable set of commands or instructions that are used to operate the battery monitoring circuit 100 according to an intended operational parameter. As a non-limiting example, the executable runtime function can include an open or closed state for the first switch 104, the second switch 106, the third switch 108 and the fourth switch 110 at the first time, the second time, or any other time. With this information, the controller module 152 can then send commands to the first switch 104, the second switch 106, the third switch 108 and the fourth switch 110 to either open or close based on the time. The method 140 can include automatically running the executable runtime function. The method 140 can include receiving an input from a user for the controller module 152 to run the executable runtime function.

Figure 4:
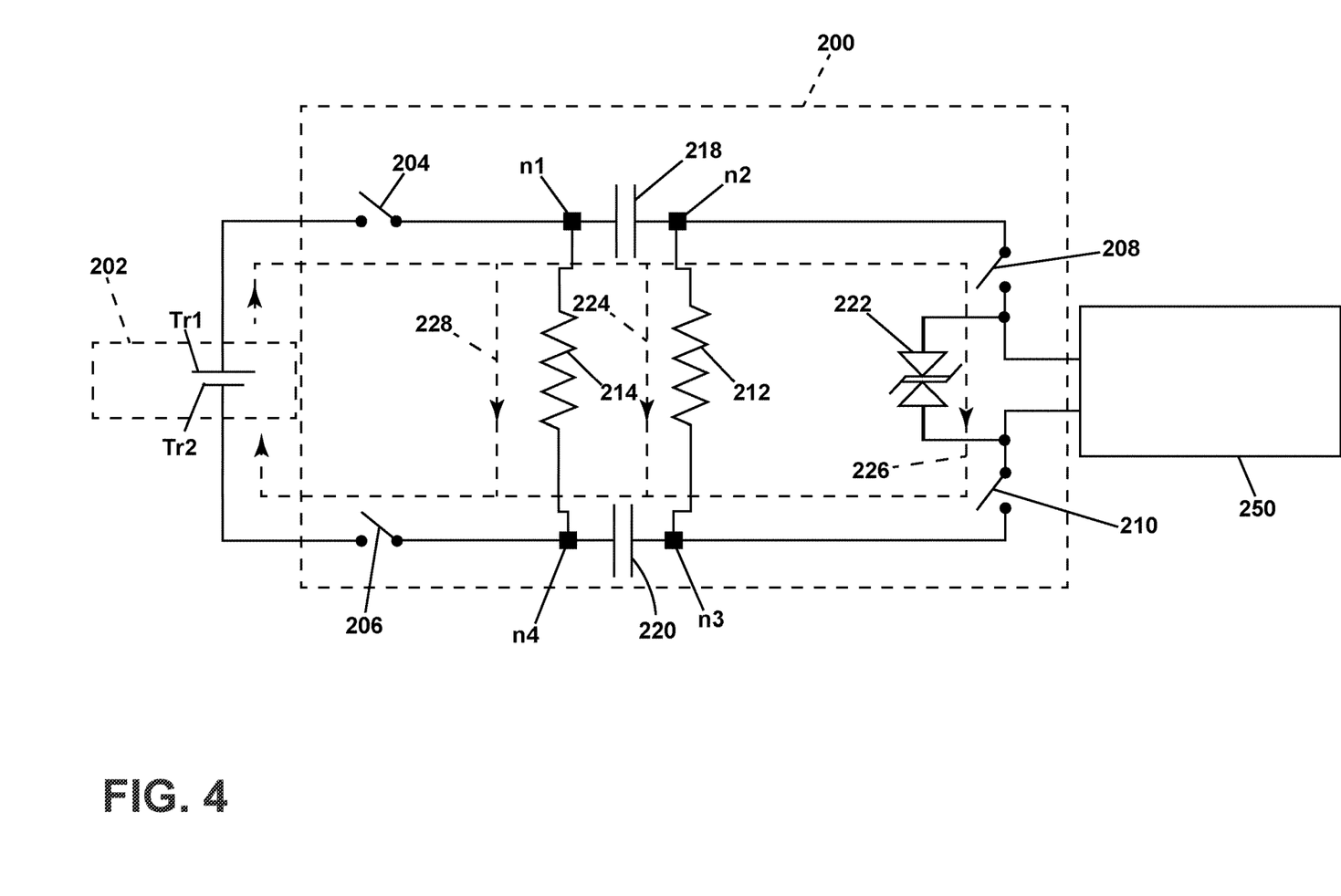
FIG. 4 is a schematic circuit diagram of an exemplary battery monitoring circuit suitable for use within the aircraft of FIG. 1, the battery monitoring circuit used to monitor the health of a set of batteries, the battery monitoring circuit including a first current loop, a second current loop, a third current loop, and a fourth current loop.

FIG. 4 is a schematic circuit diagram of an exemplary battery monitoring circuit 200 suitable for use within the aircraft 10 of FIG. 1. The battery monitoring circuit 200 is similar to the battery monitoring circuit 100, therefore, like parts will be identified with like numerals increased to the 200 series, with it being understood that the description of the battery monitoring circuit 100 applies to the battery monitoring circuit 200 unless noted otherwise.

The battery monitoring circuit 200 is selectively couplable to a set of batteries 202. The set of batteries 202 can have a first terminal (Tr1) and a second terminal (Tr2). A first switch 204 can be downstream of an in series with the first terminal (Tr1). A second switch 206 can be upstream of an in series with the second terminal (Tr2). The battery monitoring circuit 200 can include a first node (n1) downstream of an in series with the first switch 204, a first capacitor 218 can be downstream of an in series with the first node (n1), a second node (n2) can be downstream of an in series with the first capacitor 218, a third a third switch 208 can be downstream of an in series with the second node (n2), a voltage sensor 250 can be downstream of an in series with the third switch 208, a fourth switch 210 can be downstream of an in series with the voltage sensor 250, a third node (n3) can be downstream of an in series with the fourth switch 210, a second capacitor 220 can be downstream of an in series with the third node (n3), a fourth node (n4) can be downstream of an in series with the second capacitor 220, the second switch 206 can be downstream of an in series with the fourth node (n4), or any combination thereof. While not illustrated, a controller module (e.g. the controller module 152 of FIG. 2) can be communicatively coupled to the battery monitoring circuit 200.

A first resistor 212 can be provided on a branch between the second node (n2) and the third node (n3). A second resistor 214 can be provided on a branch between the first node (n1) and the sixth node (n6).

A first current loop 224 can be enabled by the first switch 204, the first node (n1), the first capacitor 218, the second node (n2), the first resistor 212, the fourth the third node (n3), the second capacitor 220, the fourth node (n4), the second switch 206, or a combination thereof, in serial arrangement. A second current loop 226 can be enabled by the first switch 204, the first node (n1), the first capacitor 218, the second node (n2), the third switch 208, the voltage sensor 250, the fourth switch 210, the third node (n3), the second capacitor 220, the fourth node (n4), the second switch 206, or a combination thereof, in serial arrangement. A third current loop 228 can be enabled by the first switch 204, the first node (n1), the second resistor 214, the fourth node (n4), the second switch 206, or a combination thereof, in serial arrangement.

The battery monitoring circuit 200 is similar to the battery monitoring circuit 100 (FIG. 2) in that it includes the first current loop 224, the second current loop 226, and the third current loop 228. The difference, however, is that the resistor with the lowest rating (e.g., the first resistor 112 of FIG. 2) is removed and instead replaced with a transient voltage suppressor 222 provided downstream of and in series with the third switch 208 and upstream of and in series with the fourth switch 210. The transient voltage suppressor 222 can be any suitable component of the battery monitoring circuit 200 that suppresses or otherwise reduces a transient over voltage. As a non-limiting example, the transient voltage suppressor 222 can be a diode. The transient voltage suppressor 222 can be in parallel with the voltage sensor 250.

Figure 5:
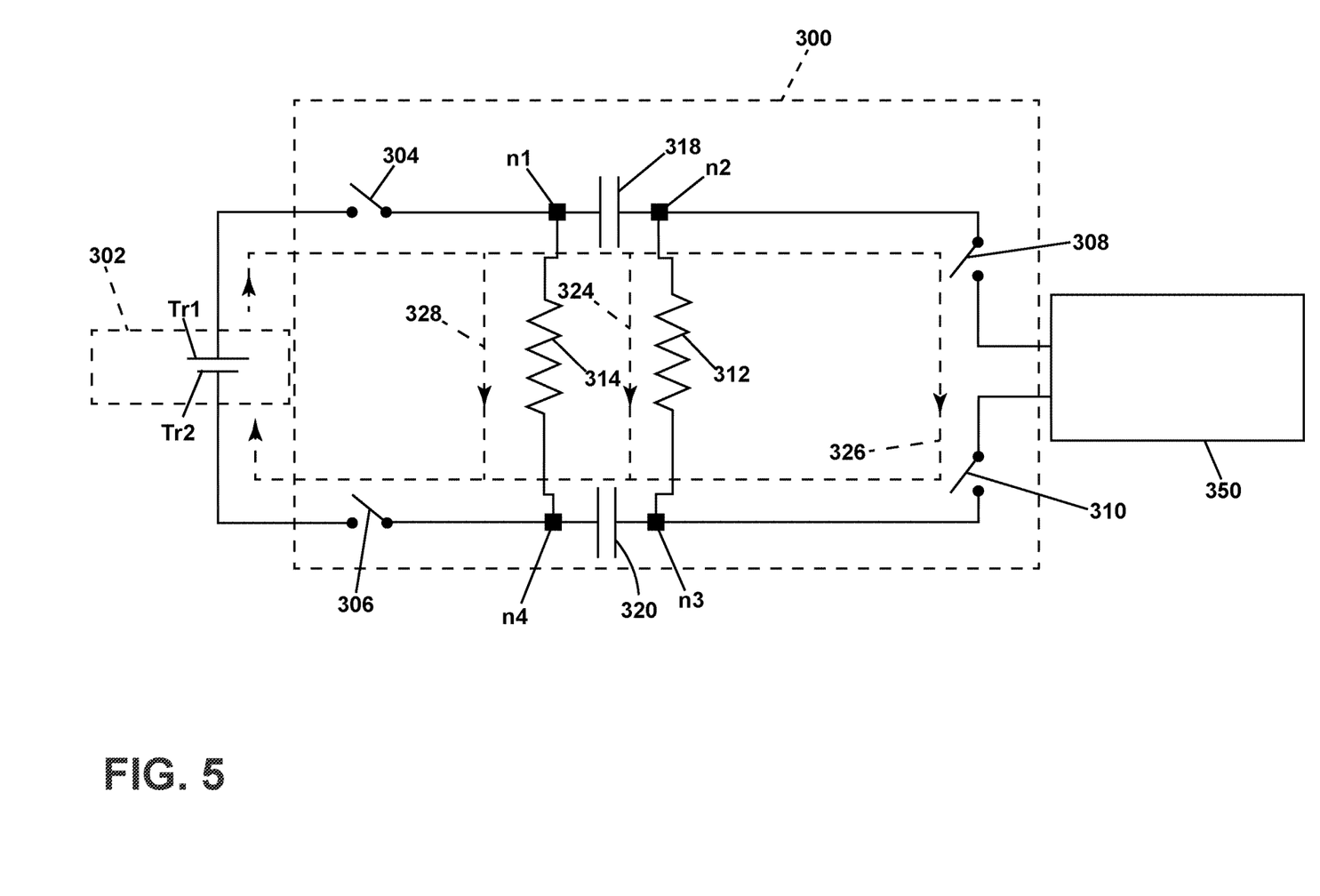
FIG. 5 is a schematic circuit diagram of an exemplary battery monitoring circuit suitable for use within the aircraft of FIG. 1, the battery monitoring circuit used to monitor the health of a set of batteries, the battery monitoring circuit including a first current loop, a second current loop, and a third current loop.

As such, the second current loop the second current loop can be enabled by the first switch 204, the first node (n1), the first capacitor 218, the second node (n2), the third switch 208, the voltage sensor 250, the transient voltage suppressor 222 in parallel with the voltage sensor 250, the fourth switch 210, the third node (n3), the second capacitor 220, the fourth node (n4), the second switch 206, or a combination thereof, in serial arrangement FIG. 5 is a schematic circuit diagram of an exemplary battery monitoring circuit 300 suitable for use within the aircraft 10 of FIG. 1. The battery monitoring circuit 300 is similar to the battery monitoring circuit 100, 200, therefore, like parts will be identified with like numerals increased to the 300 series, with it being understood that the description of the battery monitoring circuit 100, 200 applies to the battery monitoring circuit 300 unless noted otherwise.

The battery monitoring circuit 300 is selectively couplable to a set of batteries 302. The set of batteries 302 can have a first terminal (Tr1) and a second terminal (Tr2). A first switch 304 can be downstream of an in series with the first terminal (Tr1). A second switch 306 can be upstream of an in series with the second terminal (Tr2). The battery monitoring circuit 300 can include a first node (n1) downstream of an in series with the first switch 304, a first capacitor 318 can be downstream of an in series with the first node (n1), a second node (n2) can be downstream of an in series with the first capacitor 318, a third switch 308 can be downstream of an in series with the second node (n2), a voltage sensor 350 can be downstream of an in series with the third switch 308, a fourth switch 310 can be downstream of an in series with the voltage sensor 350, a third node (n3) can be downstream of an in series with the fourth switch 310, a second capacitor 320 can be downstream of an in series with the third node (n3), a fourth node (n4) can be downstream of an in series with the second capacitor 320, the second switch 306 can be downstream of an in series with the fourth node (n4), or any combination thereof. While not illustrated, a controller module (e.g. the controller module 152 of FIG. 3) can be communicatively coupled to the battery monitoring circuit 300.

A first resistor 312 can be provided on a branch between the third node (n3) and the fourth node (n4). A second resistor 314 can be provided on a branch between the second node (n2) and the fifth node (n5).

A first current loop 324 can be enabled by the first switch 304, the first node (n1), the first capacitor 318, the second node (n2), the first resistor 312, the third node (n3), the second capacitor 320, the fourth node (n4), the second switch 306, or a combination thereof, in serial arrangement. A second current loop can be enabled by the first switch 304, the first node (n1), the first capacitor 318, the second node (n2), the third switch 308, the voltage sensor 350, the fourth switch 310, the third node (n3), the second capacitor 320, the fourth node (n4), the second switch 306, or a combination thereof, in serial arrangement. A third current loop 328 can be enabled by the first switch 304, the first node (n1), the second resistor 314, the fourth node (n4), the second switch 306, or a combination thereof, in serial arrangement.

The battery monitoring circuit 300 is similar to the battery monitoring circuit 100 (FIG. 2), 200 (FIG. 4) in that it includes the first current loop 324, the second current loop 326, and the third current loop 328. The battery monitoring circuit 300, however, does not include the lowest rated resistor (e.g., the first resistor 112 of FIG. 2) or the transient voltage suppressor 222 (FIG. 3) to reduce the voltage experienced at the voltage sensor 350. Instead, the battery monitoring circuit 300 reduces the voltage by providing at least one of the first switch 304, the second switch 306, the third switch 308, the fourth switch 310, or a combination thereof as a semiconductor-based power switch. It is contemplated that the semiconductor-based power switch can be used to at least partially reduce the experienced voltage at the voltage sensor 350. As a non-limiting example, at least one of the first switch 304 or the third switch 308 can be a semiconductor-based power switch which reduces the voltage upstream of the voltage sensor 350. As such, the need for an additional resistor (e.g., the first resistor 112 of FIG. 2) or the transient voltage suppressor 222 is eliminated.

It will be appreciated that any combination of the current loops, as described herein, is contemplated. As a non-limiting example, an exemplary battery monitoring circuit can include only the first current loop 124 (FIG. 2), 224 (FIG. 4), 324 (FIG. 5) and the second current loop 126 (FIG. 2), 226 (FIG. 4), 326 (FIG. 5). As a non-limiting example, an exemplary battery monitoring circuit can include any number of two or more current loops with a second of the current loops including the voltage sensor.

Benefits associated with the present disclosure include a less costly and complex battery monitoring circuit when compared to a conventional battery monitoring circuit. For example, the conventional battery monitoring circuit that relies on determining the impedance of the set of batteries can rely on a voltage sensor with a high rating or otherwise a complex system including an impedance network requiring a processing unit to determine the impedance of the battery module that the conventional battery monitoring circuit is coupled to. The processing unit requires a stand-alone power source. The processing unit and the power source is relatively expensive and greatly increases the complexity of the circuit when compared to the battery monitoring circuit as described herein. The battery monitoring circuit as described herein, however, utilizes a relatively simple combination of current loops and method of operation in order to reduce the voltage that is experienced at the voltage sensor. This, in turn, results in a less complex battery monitoring circuit that has a decreased burden and cost of manufacture when compared to the conventional battery monitoring circuits. Further, as the voltage is reduced from the set of batteries to the voltage sensor, a voltage sensor with a relatively low voltage ratting can be used. This, in turn, greatly reduces the cost associated with the voltage sensor when compared to a conventional voltage sensor provided within the conventional battery monitoring circuit.

To the extent not already described, the different features and structures of the various aspects can be used in combination, or in substitution with each other as desired. That one feature is not illustrated in all of the examples is not meant to be construed that it cannot be so illustrated but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the disclosure are provided by the subject matter of the following clauses:

A method of monitoring a set of batteries through a battery monitoring circuit electrically couplable to the set of batteries, the method comprising closing, at a first time, a first switch and a second switch, enabling a first current loop defined by at least the first switch, a first resistor, and the second switch in series, the first current loop defining a first current suppliable from the set of batteries, closing, at a second time after the first time, a third switch, enabling a second current loop defined by the third switch and an impedance analyzer in series with the third switch, the second current loop being in parallel with the first resistor, wherein the second current loop defines a second current, less than the first current, measuring, by the impedance analyzer, a voltage experienced at the impedance analyzer based on the second current, and determining, by the measured voltage, an impedance of the set of batteries.

A battery monitoring circuit for monitoring a set of batteries electrically couplable to the battery monitoring circuit, the battery monitoring circuit comprising a first current loop having a first current suppliable from the set of batteries, the first current loop being defined by a first switch, a first resistor, and a second switch, with the first switch, the first resistor, and the second switch being in series, a second current loop having a second current, less than the first current, the second current loop being in parallel with the first current loop and being defined by a third switch, and a voltage sensor in series with the third switch, and a controller module configured to close, at a first time, the first switch and the second switch, enabling the first current loop, close, at a second time after the first time, the third switch, enabling the second current loop, receive, from the voltage sensor, a value corresponding to a measured voltage at the voltage sensor, and determine an impedance of the set of batteries based at least partially on the measured voltage.

The method of any preceding clause, further comprising closing, at the first time, the first switch and the second switch enabling the second current loop defined by the first switch, a first capacitor, the first resistor, a second capacitor, and the second switch in sequential serial arrangement.

The method of any preceding clause, further comprising closing, at the first time, the first switch and the second switch, enabling a third current loop defined by the first switch, the first capacitor, a second resistor, the second capacitor, and the second switch in sequential serial arrangement, with the third current loop being in parallel with and upstream of the first current loop.

The method of any preceding clause, further comprising rating the first resistor with a lower resistance than a resistance of the second resistor.

The method of any preceding clause, further comprising closing, at the first time, the first switch and the second switch, enabling a fourth current loop defined by the first switch, a third resistor, and the second switch in sequential serial arrangement, with the fourth current loop being in parallel with and upstream of the first current loop and the third current loop.

The method of any preceding clause, further comprising rating the first resistor with a lower resistance than a resistance of the second resistor and a resistance of the third resistor.

The method of any preceding clause, further comprising providing the fourth current loop upstream of the first capacitor and downstream of the second capacitor.

The method of any preceding clause, further comprising providing a transient voltage suppressor along the second current loop in parallel with the impedance analyzer.

The method of any preceding clause, further comprising opening, prior to closing the first switch and the second switch, the third switch.

The method of any preceding clause, further comprising closing, at the first time, the third switch and a fourth switch, enabling the second current loop defined by the third switch, the impedance analyzer, and the fourth switch in sequential serial arrangement.

The method of any preceding clause, further comprising determining, by the measured voltage and a controller module, the impedance.

The method of any preceding clause, further comprising providing the battery monitoring circuit onboard an aircraft or a turbine engine including the set of batteries.

The method of any preceding clause, further comprising closing, at the second time being greater than or equal to 0.5 seconds after and less than or equal to 1.5 seconds after the first time, the third switch.

The method of any preceding clause, further comprising estimating, via the impedance analyzer, the impedance of the set of batteries.

The method of any preceding clause, further comprising providing at least one of the first switch or the third switch as a semiconductor-based power switch.

The battery monitoring circuit of any preceding clause, wherein the first current loop further comprises, a first capacitor downstream of the first switch and upstream of the first resistor, and a second capacitor downstream of the first resistor and upstream of the second switch.

The battery monitoring circuit of any preceding clause, further comprising a third current loop defined by the first switch, the first capacitor downstream of the first switch, a second resistor downstream of the first capacitor, the second capacitor downstream of the second resistor, and the second switch.

The battery monitoring circuit of any preceding clause, wherein the first resistor has a lower resistance than a resistance of the second resistor.

The battery monitoring circuit of any preceding clause, wherein the voltage sensor is an impedance analyzer.

What is claimed is:

1. A method of monitoring a set of batteries through a battery monitoring circuit electrically couplable to the set of batteries, the method comprising:
   closing, at a first time, a first switch and a second switch, enabling a first current loop defined by at least the first switch, a first resistor, a first capacitor, and the second switch in series, the first current loop defining a first current suppliable from the set of batteries;
   closing, at a second time after the first time, a third switch, enabling a second current loop defined by the third switch and an impedance analyzer in series with the third switch, the second current loop being in parallel with the first resistor, wherein the second current loop defines a second current, less than the first current;
   measuring, by the impedance analyzer, a voltage experienced at the impedance analyzer based on the second current; and
   determining, by the measured voltage, an impedance of the set of batteries.

2. The method of claim 1, further comprising closing, at the first time, the first switch and the second switch enabling the first current loop defined by the first switch, the first capacitor, the first resistor, a second capacitor, and the second switch in sequential serial arrangement.

3. The method of claim 2, further comprising closing, at the first time, the first switch and the second switch, enabling a third current loop defined by the first switch, the first capacitor, a second resistor, the second capacitor, and the second switch in sequential serial arrangement, with the third current loop being in parallel with and upstream of the first current loop.

4. The method of claim 3, further comprising rating the first resistor with a lower resistance than a resistance of the second resistor.

5. The method of claim 3, further comprising closing, at the first time, the first switch and the second switch, enabling a fourth current loop defined by the first switch, a third resistor, and the second switch in sequential serial arrangement, with the fourth current loop being in parallel with and upstream of the first current loop and the third current loop.

6. The method of claim 5, further comprising rating the first resistor with a lower resistance than a resistance of the second resistor and a resistance of the third resistor.

7. The method of claim 5, further comprising providing the fourth current loop upstream of the first capacitor and downstream of the second capacitor.

8. The method of claim 1, further comprising providing a transient voltage suppressor along the second current loop in parallel with the impedance analyzer.

9. The method of claim 1, further comprising opening, prior to closing the first switch and the second switch, the third switch.

10. The method of claim 1, further comprising closing, at the second time, the third switch and a fourth switch, enabling the second current loop defined by the third switch, the impedance analyzer, and the fourth switch in sequential serial arrangement.

11. The method of claim 1, further comprising determining, by the measured voltage and a controller module, the impedance.

12. The method of claim 1, further comprising providing the battery monitoring circuit onboard an aircraft or a turbine engine including the set of batteries.

13. The method of claim 1, further comprising closing, at the second time being greater than or equal to 0.5 seconds after and less than or equal to 1.5 seconds after the first time, the third switch.

14. The method of claim 1, further comprising estimating, via the impedance analyzer, the impedance of the set of batteries.

15. The method of claim 1, further comprising providing at least one of the first switch or the third switch as a semiconductor-based power switch.

16. A battery monitoring circuit for monitoring a set of batteries electrically couplable to the battery monitoring circuit, the battery monitoring circuit comprising:
   a first current loop having a first current suppliable from the set of batteries, the first current loop being defined by:
      a first switch;
      a first resistor,
      a first capacitor; and
      a second switch, with the first switch, the first resistor, the first capacitor and the second switch being in series;
   a second current loop having a second current, less than the first current, the second current loop being in parallel with the first current loop and being defined by:
      a third switch; and
      a voltage sensor in series with the third switch; and
   a controller module configured to:
      close, at a first time, the first switch and the second switch, enabling the first current loop;
      close, at a second time after the first time, the third switch, enabling the second current loop;
      receive, from the voltage sensor, a value corresponding to a measured voltage at the voltage sensor; and
      determine an impedance of the set of batteries based at least partially on the measured voltage.

17. The battery monitoring circuit of claim 16, wherein the first current loop further comprises:
   the first capacitor downstream of the first switch and upstream of the first resistor; and
   a second capacitor downstream of the first resistor and upstream of the second switch.

18. The battery monitoring circuit of claim 17, further comprising a third current loop defined by:
   the first switch;
   the first capacitor downstream of the first switch;
   a second resistor downstream of the first capacitor;
   the second capacitor downstream of the second resistor; and
   the second switch.

19. The battery monitoring circuit of claim 18, wherein the first resistor has a lower resistance than a resistance of the second resistor.

20. The battery monitoring circuit of claim 16, wherein the voltage sensor is an impedance analyzer.

* * * * *